United States Patent [19]

Yoshino et al.

[11] 4,412,966
[45] Nov. 1, 1983

[54] NECK ORIENTING METHOD OF BOTTLES OF SATURATED POLYESTER RESINS

[75] Inventors: Yataro Yoshino; Sadao Suzuki; Takuzo Takada, all of Tokyo, Japan

[73] Assignee: Yoshino Kogyosho Co., Ltd., Tokyo, Japan

[21] Appl. No.: 270,291

[22] Filed: Jun. 4, 1981

Related U.S. Application Data

[62] Division of Ser. No. 92,428, Nov. 7, 1979, Pat. No. 4,297,306.

[51] Int. Cl.³ .................. B29C 17/02; B29C 17/07
[52] U.S. Cl. .................... 264/521; 264/533; 264/296; 264/314; 425/525; 425/389
[58] Field of Search ............... 264/521, 533, 296, 314; 425/525, 535, 392, 389

[56] References Cited

U.S. PATENT DOCUMENTS

| | | | |
|---|---|---|---|
| 3,032,823 | 5/1962 | Sherman | 264/533 |
| 3,271,489 | 9/1966 | Fogelberg | 264/94 |
| 3,311,950 | 4/1967 | Strauss | 18/5 |
| 3,436,803 | 4/1969 | Sarnoff | 29/432.2 |
| 3,463,803 | 8/1969 | Aichenegg | 260/453 |
| 3,695,805 | 10/1972 | Arfert | 425/393 |
| 3,801,690 | 4/1974 | Gilbert | 264/94 |
| 3,846,531 | 11/1974 | Reilly | 264/533 X |
| 4,158,692 | 6/1979 | Nilsson | 264/296 X |

FOREIGN PATENT DOCUMENTS

| | | |
|---|---|---|
| 14730 | of 0000 | Australia . |
| 23646 | of 0000 | Australia . |
| 27593 | of 0000 | Australia . |
| 35960 | of 0000 | Australia . |
| 58783 | of 0000 | Australia . |
| 58905 | of 0000 | Australia . |
| 2543640 | of 0000 | Fed. Rep. of Germany . |

*Primary Examiner*—Jan H. Silbaugh
*Attorney, Agent, or Firm*—Parkhurst & Oliff

[57] ABSTRACT

A method of orienting the neck of a bottle of a saturated polyester resin so as to enhance the physical properties and durability of the neck. The neck orienting method includes the step of inserting an orienting rod having a taper head into the neck which is being heated. The neck orienting method may include the step of orienting only the mouth edge of the neck.

7 Claims, 20 Drawing Figures

NECK ORIENTING METHOD OF BOTTLES OF SATURATED POLYESTER RESINS

This is a division of application Ser. No. 092,428, filed Nov. 7, 1979, now U.S. Pat. No. 4,297,306.

BACKGROUND OF THE INVENTION

1. Field of the Invention

The present invention relates to a bottle made of a saturated polyester resin, and more particularly to a neck orienting method of orienting not only the trunk but also the neck of the bottle thereby to enhance the physical properties and durability of the bottle neck.

2. Description of the Prior Art

Saturated polyester resins such as polyethylene terephthalate have recently been used in various fields because of their excellent physical properties and durability. However, these excellent properties are not exhibited until the moldings of such resins are subjected to an orienting treatment.

Therefore, the molding method of the saturated polyester resin bottles is generally limited to the blow molding method.

The current molding procedures of the saturated polyester resin bottles include the steps of injection-molding a bottomed cylindrical parison as a primary molding, orienting the neck of the parison, while being held in a blow mold, in the axial direction with the use of an orienting pin, and injecting a fluid under pressure into the oriented parison to blow-mold a bottle having a shape according to a blow mold. As is apparent from those molding procedures, however, the neck of the bottle is completely left unoriented.

As a result, the neck of the bottle exhibits inferior physical properties and durability compared to other portions. For instance, if the bottle thus molded is filled with alcohol of high concentration, only its neck (which has not been biaxially oriented) is whitened and becomes mechanically fragile due to attack of the alcohol.

SUMMARY OF THE INVENTION

It is therefore a primary object of the present invention to provide a method of easily orienting the neck of a bottle made of a saturated polyester resin thereby to enhance the physical properties and durability of the bottle as a whole.

A second object of the present invention is to provide a method of orienting the neck of the bottle, expecially, the mouth edge of the neck, which is liable to become mechanically fragile, thereby to prevent the same from being deteriorated.

A third object of the present invention is to provide a method of making it possible to orient the neck of the bottle without fail in accordance with the design.

A fourth object of the present invention is to provide a method of once reducing the neck of a parison into a converging taper shape and then orienting the neck at a high orienting ratio.

BRIEF DESCRIPTION OF THE DRAWINGS

Other objects and advantages of the present invention will become apparent from the following description with reference to the accompanying drawings, in which:

FIGS. 1 to 3 illustrate a first embodiment of a bottle neck orienting method according to the present invention.

FIGS. 6 and 7 illustrate the cases, in which the neck is formed on its outer circumference with a thread while being Oriented according to the first embodiment.

FIGS. 8 and 9 illustrate the cases, in which the neck is formed in advance on its outer circumference with the thread when the parison is molded.

FIGS. 15 to 20 illlustrate a fourth embodiment of a bottle neck orienting method according to the present invention.

DESCRIPTION OF THE PREFERRED EMBODIMENTS

A first embodiment of the present invention will be described with reference to FIGS. 1 to 3. First of all, a saturated polyester resin is injection-molded into a generally tubular parison 1. This parison 1 is constructed to include a bottom 2, a trunk 3 extending upwardly from the bottom 2, a shoulder 4 reduced from the trunk 3, and a neck 5 having a smaller diameter than the trunk 3. The neck 5 is formed at its upper extremity with an outwardly bulging mouth edge 6 and is made slightly thicker than that which will be used, as it is, as the neck of a bottle product without being oriented according to the prior art.

Figure 1:
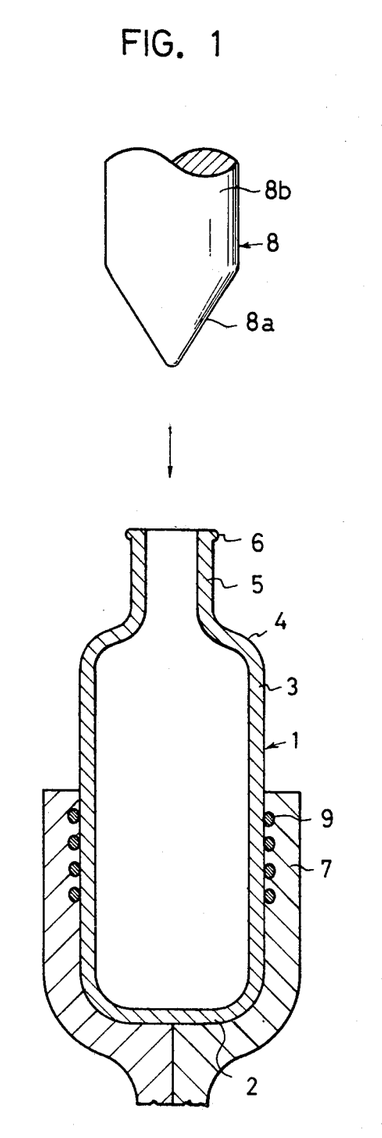
FIG. 1 is a diagrammatical view showing the relationship between a parison before its orienting process and an orienting rod.
Figure 2:
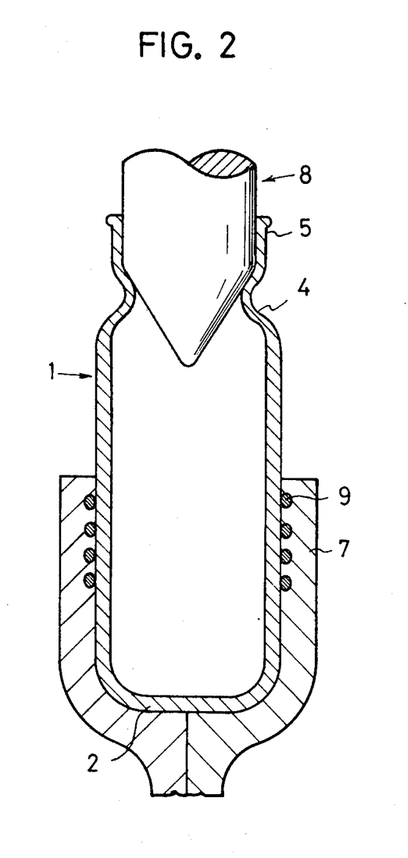
FIG. 2 is also a diagrammatical view but shows the relationship between the parison after its orienting process and the orienting rod.

Then, the lower portion of the parison 1 is held in a body holder 7 and is arranged in an upright position, as shown in FIG. 1, so that the neck 5 may be oriented by means of the orienting rod 8 of an orienting device.

The body holder 7 is composed of a pair of holder halves forming a cavity corresponding to the parison 1 and is lined with a friction member 9 which is to be brought into the parison 1.

On the other hand, the orienting rod 8 is composed of a converging taper head 8a and a straight rod body 8b which extends from such a portion as the outer diameter of the taper head 8a restores the inner diameter of the neck of the bottle.

Prior to the orientation, the neck 5 is heated to a temperature higher than such a glass transition level as can orient the neck 5. This heating step of the parison 1 is performed by the well known method using an ultrared ray or hot wind before the parison 1 is held in the body holder 7. The parison 1 may be heated after it is held in accordance with the producing procedures adopted.

In order to orient the neck 5, the orienting device is then operated to force the orienting rod 8 into the neck 5. With a view to smoothening that insertion, it is desired that the slope of the taper head 8 of the orienting rod 8 be as gentle as possible. It is also desired that the orienting rod 8 be made slidable without any difficulty either by applying a lubricant to the taper head and/or the rod body 8b or by locally cooling and solidifying only the inner wall of the neck 5. If, in this way, the rod body 8b of the orienting rod 8 is inserted until it reaches the lower end of the neck 5, this neck 5 is radially expanded and oriented to the last.

Figure 3:
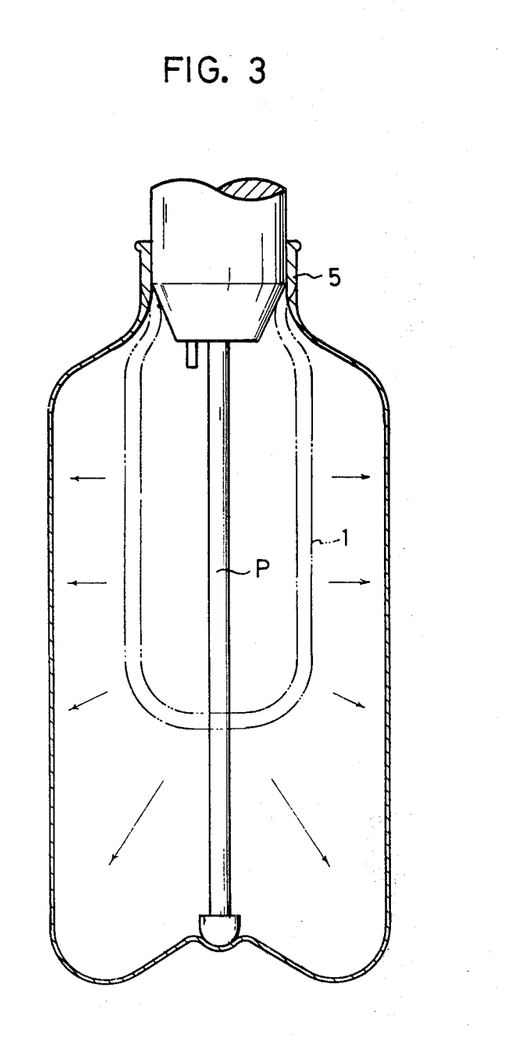
FIG. 3 is also a diagrammatical view showing the condition under which the parison oriented is being blow-molded.

After that, the parison 1 having its neck oriented is blow-molded, as shown in FIG. 3, so that they may be biaxially oriented according to the prior art. More specifically, the parison 1 is held in a blow mold, and a fluid under pressure is pumped into the parison 1, while the bottom of the parison 1 is being pushed downward by means of an orienting pin P, until the desired bottle product is made.

As has been described hereinabove, according to the bottle neck orienting method of the present invention, the orienting rod is smoothly forced into the neck of the parison by the action of the taper head of the orienting rod so that the working efficiency can be enhanced, while ensuring the desired accurate orientation, in the production of the saturated polyester resin bottle which is excellent in the physical properties and durability.

Although it is described in the above that a lubricant is applied to the taper head 8a with a view to reducing the frictional resistance between the orienting rod 8 and the neck 5, it is still difficult to completely eliminate that frictional resistance. As a result, the neck may be slightly constricted and deformed during the inserting operation of the orienting rod 8 into the neck 5.

Figure 4:
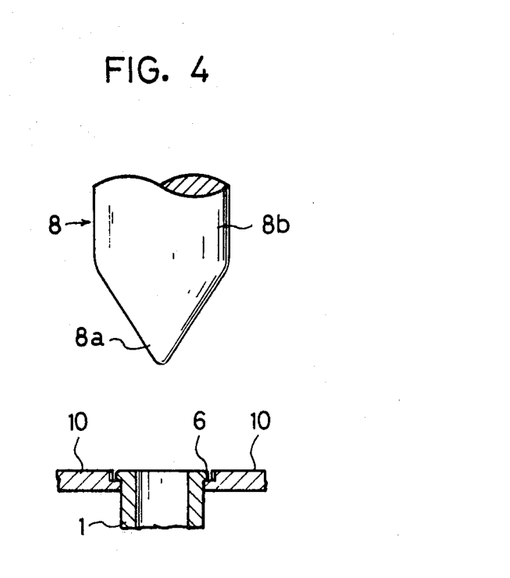
FIGS. 4 and 5 are a side elevation and a top plan elevation showing mouth holding arms for holding the mouth of the parison without fail so that they may neither be compressed nor deformed while being oriented according to the first embodiment, respectively.
Figure 5:
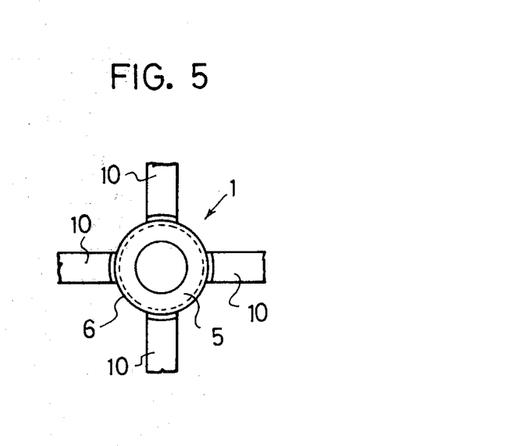

Therefore, in case it is necessary to completely eliminate the constriction and deformation at the parison neck 5, this neck is head, as shown in FIGS. 4 and 5, by means of mouth holding arms 10 which are made movable back and forth. In this case, more specifically, the mouth edge 6 of the neck 5 is retained at its four portions by the leading ends of the respective holding arms 10, and these holding arms 10 are moved back and forth through a not-shown cam mechanism or the like in accordance with the length of insertion of the orienting rod 8 into the neck 5. Since use is made of the fact that the radius of the taper head 8a of the orienting rod 8 is varied with the length of insertion of the rod 8, it becomes possible to orient the neck 5 in an accurate size.

Figure 6:
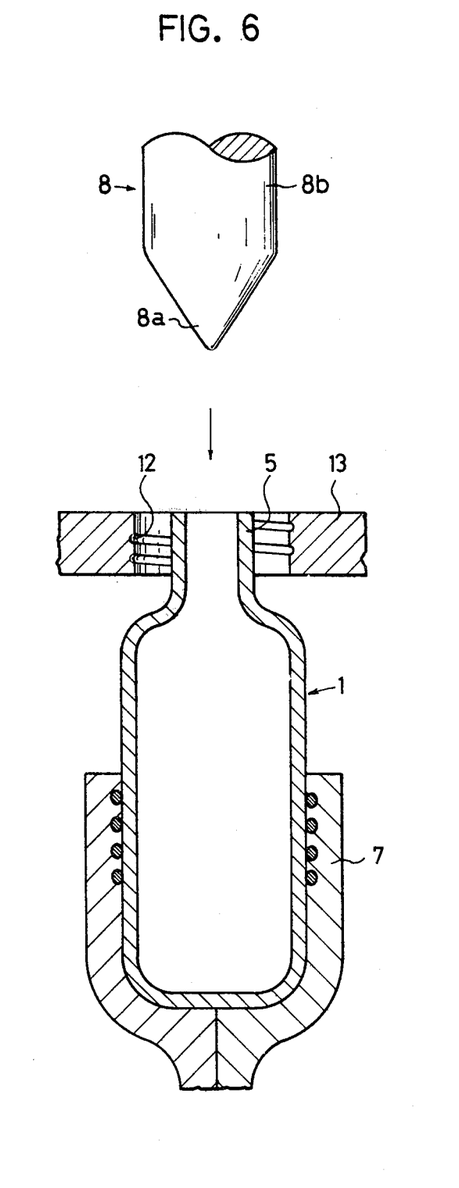
FIG. 6 is a longitidinal section showing the condition before the orienting process.
Figure 7:
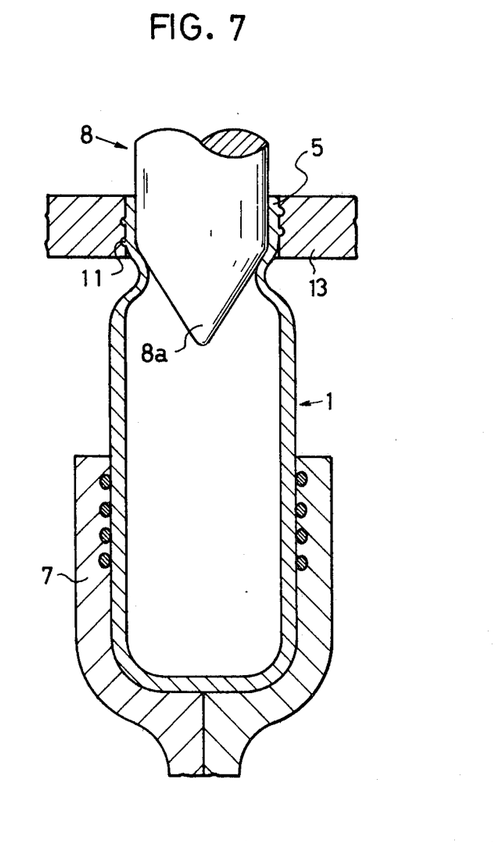
FIG. 7 is also a longitudinal section but shows the condition after the orientation and the formation of the thread.

Turning now to FIGS. 6 and 7, the description proceeds to the case, in which a thread 11 is formed on the outer circumference of the neck 5 simultaneously as the neck 5 is oriented with the use of the orienting rod 8. In this case, the neck 5 of the parison 1 held in the body holder 7 is positioned in a neck shaping mold 13 which is formed with a female thread 12 in its inner wall. If the aforementioned orienting rod 8 is forced into the neck 5, as shown in FIG. 7, the desired male thread 11 is formed on the outer circumference of the neck 5 simultaneously as this neck 5 is oriented. The thread 11 thus formed can enjoy a high accuracy in size because it is unnecessary to orient the neck 5 thereafter.

Figure 8:
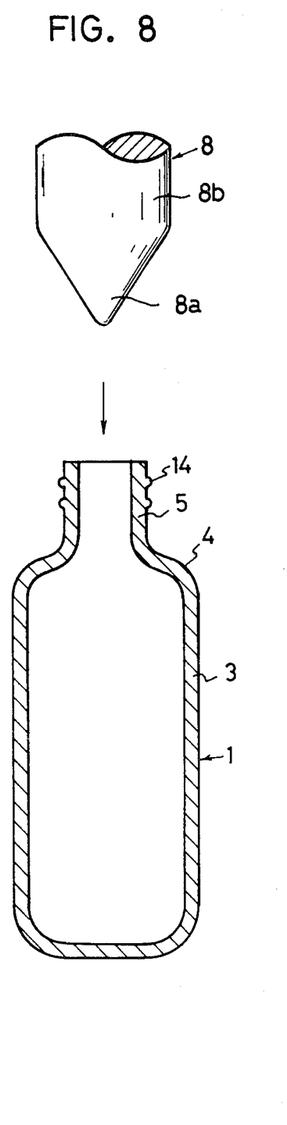
FIG. 8 is a longitudinal section but shows the condition before the orientation.
Figure 9:
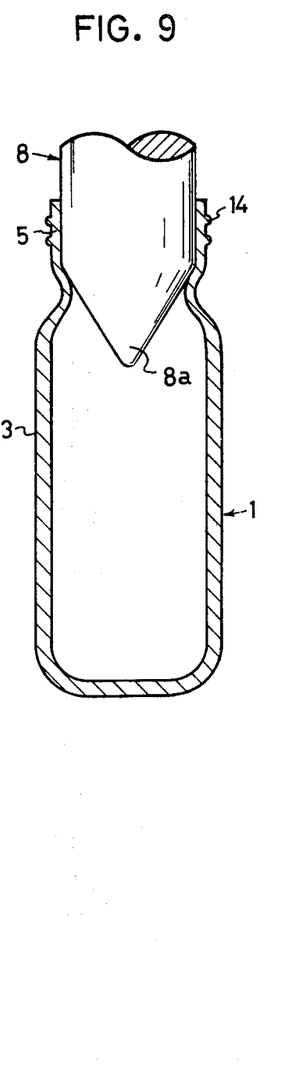
FIG. 9 is also a longitudinal section but shows the condition upon completion of the orientation.

With reference to FIGS. 8 and 9, the description is changed to the case, in which a thread 14 is formed on the outer circumference of the neck 5 of the parison 1 upon the injection molding process of the parison 1.

In this case, it is unnecessary to use the mold shown in FIGS. 6 and 7 but is sufficient to orient the neck 5 by the forcing action of the orienting rod 8 into the parison 1 which is formed with the thread 14 in advance. However, when the neck 5 is oriented by the orienting action of the orienting rod 8, the thread 14 which has already been formed by that time is also oriented. It is therefore necessary to make the thread 14 sightly thicker, while taking the subsequent orientation into consideration, when the thread 14 is to be formed at first by the injection molding process.

Figure 10:
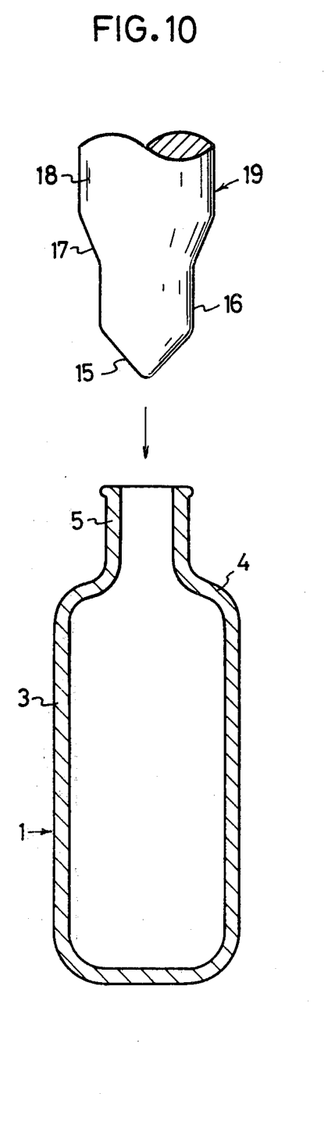
FIG. 10 is a diagrammatical view showing the relationship between the parison and the orienting rod which is modified from the orienting rod of the first embodiment.

Although the orienting rod used in the foregoing neck orientation is composed of one taper head and one rod body, it is desired in the case of a relatively large expansion that an orienting rod 19 having a step shape shown in FIG. 10 be used. The orienting rod 19 in this case is constructed to include not only a taper head 15 and a straight neck 16 but also a taper shoulder 17 and a rod body 18. If desired, incidentally, the orienting rod 19 may be shaped to have two or more steps.

By forming the leading end of the orienting rod 19 into a multi-step shape, the orienting operation of the neck 5 can be attained without any difficulty.

Although, in the foregoing description, the parison is made to have its neck smaller than its trunk, the shape of the parison is not limited to that and can be extended to that, in which the neck and the trunk have the same diameter.

Figure 11:
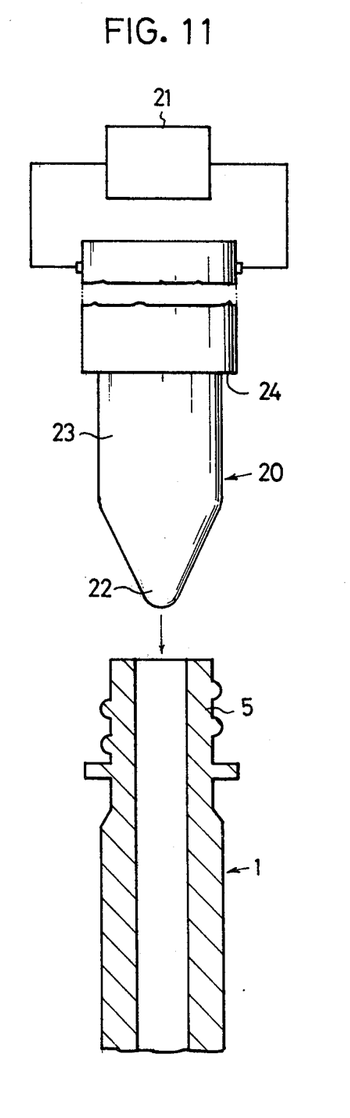
FIG. 11 is a diagrammatical view showing the relationship between the parison before the orientation and the orienting rod before the orientation and the orienting rod according to a second embodiment.
Figure 12:
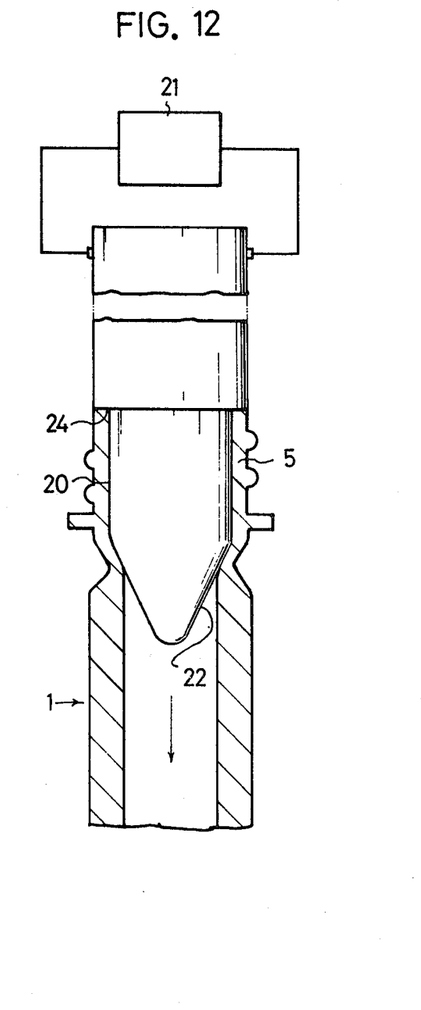
FIG. 12 is also a diagrammatical view but shows the relationship between the parison after the orientation and the orienting rod according to the same embodiment.

A second embodiment of the present invention will now be described with reference to FIGS. 11 and 12. According to the second embodiment, the orienting device is constructed to have its orienting rod 20 connected to an ultrasonic wave generator 21 so that it may act as an ultrasonic wave generating horn.

The orienting rod 20 is shaped to include a taper head 22 at its leading end and a neck 23 extending upward from the taper head 22. The neck 23 is formed at its upper portion with a step shoulder 24 having such a length as regulates the insertion of the neck 23 into the parison neck 5.

When the neck 5 is to be oriented with the use of the orienting device thus constructed, the orienting rod 20 is forced gradually, while generating the ultrasonic waves, into the parison neck 5 being held. When the orienting rod 20 begins to contact with the inner wall of the neck 5, this neck 5 is heated to such a temperature by the ultrasonic waves generated from the orienting rod 20 as has the orienting effects. Simultaneously with this, the orienting rod 20 is forced into the neck 5 so that this neck 5 is oriented in such a form as to be radially expanded. Since, in this instance, the orienting rod 20 goes into the neck 5 while generating the ultrasonic waves, the frictional resistance to be established between the orienting rod 20 and the neck 5 is so remarkably reduced that the insertion can be smoothly attained.

After that, the orienting rod 20 is further forced into the neck 5 until its step shoulder 24 abuts against the uppermost end of the mouth of the parison, thus completing the orientation of the neck.

In these ways, it is sufficient that the orienting rod generating the ultrasonic waves is inserted into the neck 5. In case, however, it is intended to finish the orienting operations of the neck 5 within a shortened time period, the whole body or inner wall of the neck should be heated to some extent before it receives the orienting rod 20. Since, in this case, the heat to be generated from the orienting rod by the ultrasonic waves may be reduced to a smaller quantity, the inserting speed of the orienting rod can be accordingly increased.

As is apparent from the foregoing description, according to the second embodiment, the ultrasonic waves are used as a heat source for orienting the neck 5 and are generated from the orienting rod 20. As a result, the heating operation of the neck 5 can be performed remarkably efficiently and effectively. Moreover, the frictional resistance between the neck and the orienting rod can be reduced to such a low level that the orienting process can be accordingly performed while maintaining remarkably high accuracy in orienting sizes.

Figure 13:
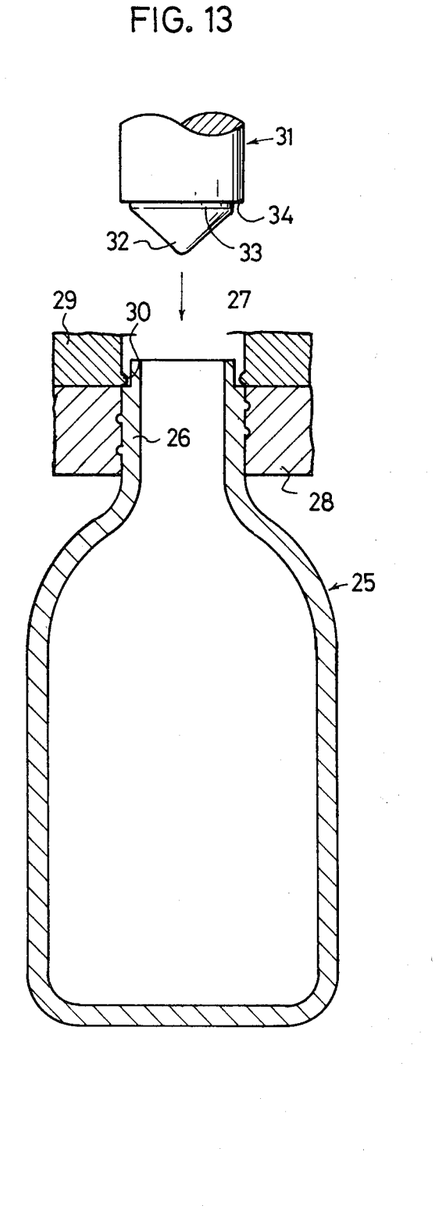
FIG. 13 is a diagrammatical view showing the relationship between the parison before the orientation and the orienting rod according to a third embodiment.

A third embodiment of the present invention will now be described with reference to FIGS. 13 and 14. In accordance with this third embodiment, only the mouth edge of the parison neck is to be subjected to the orienting treatment. In other words, that portion of the neck, which is the most liable to lose the durability, is oriented.

The neck 26 of a parison 25 to be used in the third embodiment is formed during the injection molding process with a mouth edge 27 which is stepwise reduced and which is located at the uppermost end of the neck 26.

In order to orient the mouth edge 27 of the parison 25, this parison 25 is held at its neck 26 by means of a neck holder 28. This neck holder 28 is constructed to have its upper side positioned at the same level as the lower end of the mouth edge 27 and is composed of two grooved semicircular halves, which are brought into abutment engagement with each other thereby to hold the neck 26. A mold 29 is overlaid on the upper side of the neck holder 28. The mold 29 is formed at its center with a hole, which encloses the mouth edge 27 of the neck 26 at a spacing therefrom, and with an annular stopper projection 30 which is located at the lower inner wall edge of the hole to provide a stopper.

The neck 26 is held in the manner thus far described, and the the mouth edge is heated to the orientable temperature. Then, an orienting rod 31 is forced into the mouth edge 27. The orienting rod 31 to be used in the third embodiment is constructed to include a shorter taper head 32 and a shorter straight neck 33 than the taper rod and the rod body of the first embodiment. This is because only the mouth edge 27 is oriented according to the third embodiment. On the other hand, the orienting rod 31 is formed with such a step 34 at the upper end of the straight neck 33 as provides a stopper to regulate the insertion length of the orienting rod 31.

Figure 14:
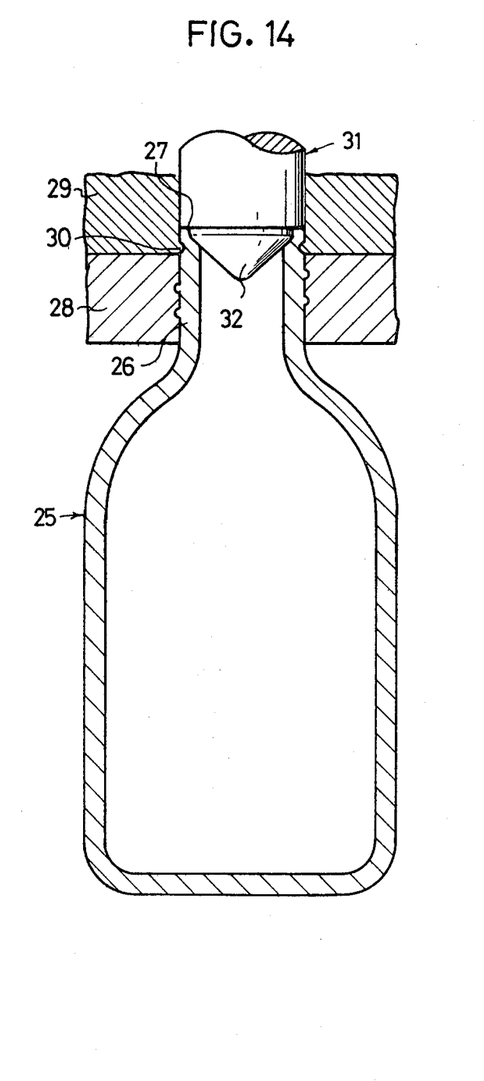
FIG. 14 is also a diagrammatical view but shows the relationship between the parison after the orientation and the orienting rod according to the same embodiment.

As is seen from FIG. 14, therefore, when the orienting rod 31 is inserted into the mouth edge 27, this edge 27 is forced into the annular clearance between the orienting rod 31 and the mold 29 so that the mouth edge 27 is molded and oriented.

According to the third embodiment thus far described, the mouth edge of the neck 26 can be located oriented so that it can exhibit the desired excellent physical properties and durability. As a result, the sealing effects and mechanical strength at the plug portion of the saturated polyester resin bottle produced according to the third embodiment can be prevented from being deteriorated. Even in case, moreover, the bottle neck is formed on its outer circumference with the thread, that portion is not subjected to the orienting treatment so that the accuracy of the thread can be maintained excellent. Incidentally, although the orientation of the mouth edge is performed prior to the blow molding treatment of the bottle trunk, it may be accomplished after the blow molding treatment, if desired.

Finally, a fourth embodiment of the present invention will now be described with reference to FIGS. 15 to 20. According to this fourth embodiment, the parison neck is once pressed into a converging shape and then is oriented with the use of an orienting rod so that its mouth edge may be subjected to the highest orienting treatment.

Figure 15:
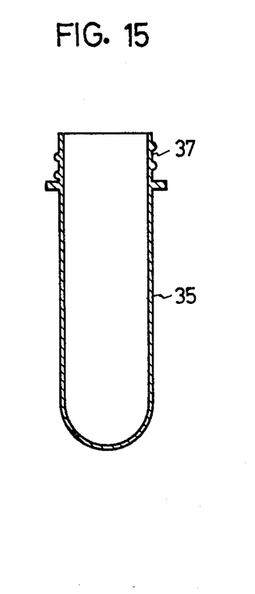
FIG. 15 is a sectional view showing the parison which has been subjected to the injection molding treatment.
Figure 16:
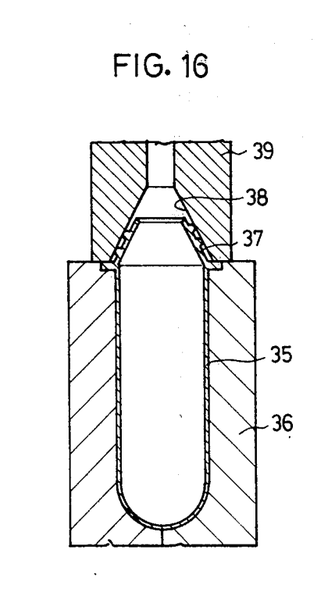
FIG. 16 is also a sectional view but shows the condition under which the neck of the parison is reduced.

More specifically, a parison 35 having its trunk and neck of the same diameter, as shown in FIG. 15, is prepared by the injection molding process and is held at its trunk by means of a parison holder 36. Then, the neck 37 of the parison 35 is heated to about 100° C., and a reducing mold 39 having a taper inner wall 38 is pressed onto the neck 37 so that this neck 37 is reduced into a taper shape, as shown in FIG. 16.

Figures 17, 19:
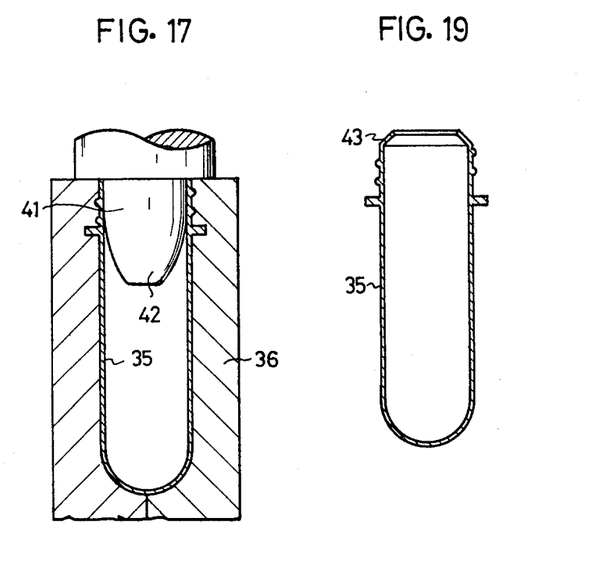
FIG. 17 is also a sectional view but shows the condition under which the neck is oriented after the reducing treatment.
FIG. 19 is also a sectional view but shows the case in which only the mouth edge of the neck of the parison is reduced.

After that, the neck 37 is further heated to the orientable temperature, and the parison 35 is held in a shaping mold 40. Then, the orienting rod 41 of an orienting device is forced into the parison 35 thus prepared, as shown in FIG. 17. The orienting rod 14 being used is made similar to that of the first embodiment such that it is formed at its leading end with a curved taper head 42.

Figure 18:
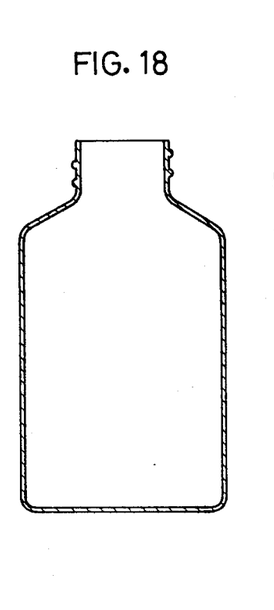
FIG. 18 is also a sectional view but shows a bottle which is produced by blow-molding the parison.

After that, the parison 35 thus prepared is subjected to the normal blow molding treatment so that the bottle shown in FIG. 18 is produced.

Figure 20:
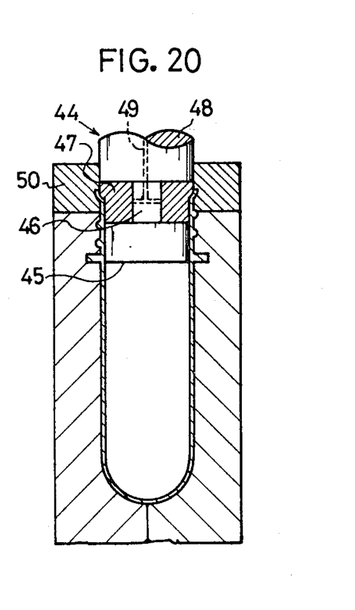
FIG. 20 is also a sectional view but shows the condition under which the mouth edge of the neck shown in FIG. 19 is oriented.

If, on the other hand, it is intended to orient only the mouth edge 43 of the neck, only this mouth edge 43 may be pressed into a taper shape, as shown in FIG. 19, and then be oriented, as shown in FIG. 20.

The orienting device 44 shown in FIG. 20 is constructed to include a plunger 46 carring a lower piston 45 at its leading end, an elastic tubular member 47 mounted on the plunger 46, and an upper piston 48 connected to the upper end of the plunger 46 while sandwitching the tubular member 47 between itself and the lower piston 45. A communication passage 49 is formed in the upper piston 48 and the plunger 46 so that air under high pressure is injected therethrough onto the inner wall of the elastic tubular member 47 to expand the upper portion of the tubular member 47. As a result, the neck 43 is forced onto a shaping mold 50 so that it is oriented.

As has been described hereinabove, according to the fourth embodiment, in case the parison neck is once pressed and then is oriented, the parison can be molded to have its neck and trunk of the same diameter so that its molding process can be simplified. Since, moreover, the parison neck is oriented into a cylindrical shape after it has been pressued into the taper shape, its mouth edge, which might otherwise be expecially liable to be cracked, can be oriented to the most extent, which is desired from the standpoint of the orienting treatment.

What is claimed is:

1. A method of forming the neck portion of a synthetic resin bottle, the method comprising the steps of:
   (a) forming a parison of synthetic resin, the parison having a neck and a body and capable of being further formed into a bottle;
   (b) heating at least a portion of the neck to a temperature sufficent to permit molding thereof;
   (c) pressing the heated neck portion into a tapered shape converging inwardly in a direction away from the body of the parison;
   (d) further heating the tapered neck portion of the parison to an orientable temperature; and
   (e) operating on the tapered neck portion at the orientable temperature by means of an orienting device inserted into the neck portion of the parison to outwardly expand the neck portion from its inwardly converging shape so as to achieve orientation within the neck portion.

2. A neck orienting method as set forth in claim 1, wherein said orienting step includes inserting into the neck portion of the parison an orienting rod formed at its leading end with a tapered head and at its base with a straight rod body.

3. A neck orienting method as set forth in claim 1, wherein only the mouth edge of the neck is heated and pressed into a tapered shape.

4. A neck orienting method as set forth in claim 1, wherein said orienting step includes inserting into the neck portion of the parison an elastic tubular member made so expandable as to orient the mouth edge of said neck upon expansion thereof.

5. A neck orienting method as set forth in claim 1, wherein the entire neck of the parison is heated and pressed into a tapered shape.

6. The neck orienting method of claim 1, wherein subsequent to the orienting step, the parison is subjected to a blow molding process.

7. The neck orienting method of claim 1, wherein the orienting device is an inflatable tubular member, and the orienting method further comprises the step of inflating the tubular member after insertion into the neck portion so as to orient neck portion.

* * * * *